United States Patent [19]
Dittmann et al.

[11] 4,259,410
[45] Mar. 31, 1981

[54] RANDOM PROPYLENE COPOLYMERS FOR ELECTRIC CABLE INSULATION

[75] Inventors: Walter Dittmann; Albert Frese; Otto Hahmann; Johannes Plenikowski, all of Marl; Helmut Klawitter, Herten, all of Fed. Rep. of Germany

[73] Assignee: Chemische Werke Huels Aktiengesellschaft, Fed. Rep. of Germany

[21] Appl. No.: 893,911

[22] Filed: Apr. 6, 1978

[30] Foreign Application Priority Data

Apr. 6, 1977 [DE] Fed. Rep. of Germany ....... 2715349

[51] Int. Cl.³ .............................................. B32B 15/08
[52] U.S. Cl. .............................. 428/461; 174/110 SR; 427/117
[58] Field of Search ................... 260/45.75 C, 45.7 R; 526/348, 348.5, 348.6; 428/461; 427/117; 174/110 SR

[56] References Cited

U.S. PATENT DOCUMENTS

| | | | |
|---|---|---|---|
| 3,793,473 | 2/1974 | Pointer | 260/45.75 C |
| 3,959,409 | 5/1976 | Frese et al. | 526/348.6 |
| 4,000,354 | 12/1976 | Baxmann et al. | 526/348.6 |
| 4,008,200 | 2/1977 | Avar et al. | 260/45.75 C |
| 4,012,399 | 3/1977 | Hechenbleikner et al. | 260/45.75 C |
| 4,101,512 | 7/1978 | Schmidt et al. | 260/45.7 R |

*Primary Examiner*—Paul R. Michl
*Attorney, Agent, or Firm*—Millen & White

[57] ABSTRACT

As insulation for electric cables, there is provided an improved polyolefin having low shrinkage values, high elongation values, even after aging, the desired electrical insulation properties, and comprising partially crystalline, randomly copolymerized polypropylene having a proportion of ethylene, butene-1 and/or 1-hexene incorporated by polymerization of 1–6% by weight, a xylene-soluble proportion of 2–20% by weight, a viscosity value I of 200–400 cc./g., a melt flow index value (MFI$_{190/5}$) of 1–20 g./10 min., and an elongation value of above 700%.

17 Claims, No Drawings

RANDOM PROPYLENE COPOLYMERS FOR ELECTRIC CABLE INSULATION

BACKGROUND OF THE INVENTION

This invention relates to the use of partially crystalline, randomly copolymerized polypropylene for the production of electric cable insulation.

Homopolymeric crystalline polypropylene is unsuitable for cable jacketing due to its hardness, rigidity, and brittleness, especially at low temperature. Therefore, cable jacket insulation has heretofore been manufactured from crystalline, polymeric compositions of sequence-type, i.e. block, polymers made up of propylene and/or propylene copolymers containing between 10 and 30% by weight of polymerized ethylene and having a melt flow index (230° C./2.16 kg. load) of between 0.01 and 0.5 (British Pat. No. 1,328,102).

These polymeric compositions of sequence-type polymers having a high ethylene content are, however, difficult to manufacture on the one hand, and difficult to process on the other hand. In particular, they are not amenable to operations for insulating electrical conductors at high operating speed, e.g., 10 to 100 meters per minute, for example telephone cable, field cable, etc. Moreover, these sequence-type polymers, despite their high ethylene content, are still undesirably hard and stiff for cable jacketing. Furthermore, the sequence-type polymers exhibit very low elongation values which are relatively unsatisfactory for cable jacketing, and these elongation values are even further lowered by aging. Still further, sequence-type polymers, being multiphase systems, exhibit differing shrinkage behaviors depending on their composition.

Consequently, there is a need for a readily processable material for the production of cable jacket insulation which is not too stiff and which has a low shrinkage and high elongation values even after aging.

SUMMARY OF THE INVENTION

An object of this invention is to satisfy the need for improved materials for the production of electric cable insulation.

Another object is to provide improved electric cable insulation and methods of producing and using same.

Upon further study of the specification and appended claims, further objects and advantages of this invention will become apparent to those skilled in the art.

To attain these objects, there is provided a randomly copolymerized polypropylene having a low copolymer proportion of 1–6% by weight, xylene-soluble proportions of 2–20% by weight, viscosity values I of 200–400 cc./g. (DIN 53 728), melt flow index values of $MFI_{190/5}=1$–20 g./10 min., and elongation values of above 700%. This copolymer has a surprisingly low rigidity which is very unexpected since homopolymeric polypropylene as well as the sequence-type propylene copolymer with a copolymer proportion of 10–30% by weight of ethylene are much too rigid. In addition, the polypropylene copolymer used in accordance with this invention exhibits the advantage of low shrinkage values and high elongation values even after aging.

The partially crystalline, random propylene copolymers utilized according to this invention are conventionally obtained by the polymerization of propylene with the addition of ethylene, butene-1 and/or 1-hexene according to the low-pressure method with the aid of Ziegler-Natta catalysts, e.g. from $TiCl_3$ or $TiCl_3.nAlCl_3$ ($n=0.2$–$0.6$), on the one hand, and chlorine-containing organoaluminum compounds, on the other hand, at temperatures of up to about 100° C. In the random copolymerization by a discontinuous process, butene-1 and/or 1-hexene are charged together with the propylene; ethylene is then metered into the charge during the entire polymerization period. Using a continuous technique on the other hand, propylene, ethylene, butene-1 and/or 1-hexene are added in the same way in metered amounts during the polymerization. Based on propylene, about 1–6%, preferably 2–5% of ethylene is added, while butene-1 and/or 1-hexene are added in amounts of about 0.1–10%, preferably 0.2–2.5%, since they polymerize more gradually than propylene. The adjustment to the required I value takes place by molecular weight control with the aid of hydrogen. For further detailed information, attention is invited to US-P 3 051 690.

Suitable Ziegler-Natta catalysts are mixed catalysts, for example of titanium (III) chlorides and chlorine-containing organometallic compounds of aluminum. Suitable titanium trichlorides are preferably thermally unstable titanium-aluminum chlorides of the composition $TiCl_3.nAlCl_3$ ($n=0.2$–$0.6$), especially in the γ- and δ-modification, as they are formed by the reduction of titanium tetrachloride with metallic aluminum or organoaluminum compounds and optionally activation, for example by grinding. The titanium-aluminum chlorides obtained by the reduction with organoaluminum compounds are preferably tempered, after the reduction, at temperatures of 70°–150° C.

Suitable chlorine-containing organoaluminum compounds are preferably the dialkyl aluminum chlorides, especially diethylaluminum chloride.

The polymerization can be conducted in the monomers and comonomers, such as butene-1 and 1-hexene, but it can also be conducted in diluents, such as propane, butane, butene-2, pentane, hexane, and higher hydrocarbons. Butane-butene-2 mixtures are preferably employed because they can be removed readily and without deleteriously affecting the product by passing the product through nozzles. Butene-2 additionally has the special advantage that it accelerates the polymerization speed in general as well as, in particular, the copolymerization. A preferred butene-2-butane mixture comprises the sump products of the butene-1 concentration from $C_4$-cuts which simultaneously contain butene-1, suitable as the comonomer, in amounts of 0.1–2.5%. For further detailed information, attention is invited to US-P 3 920 621 and US-P 3 959 409.

Processing is effected preferably by passing the product through nozzles wherein the polymeric proportions dissolved in the diluent are not separated. Saving the step of separating the dissolved polymeric proportions considerably simplifies the manufacturing process and is essential for obtaining the desired characteristic values. For further details, attention is invited to US-P 3 959 409.

The partially crystalline, random propylene copolymers used in accordance with this invention have, in percent by weight the following composition:

| Monomer | General | Preferred | Most Preferred |
| --- | --- | --- | --- |
| ethylene | 1,0–5,0 | 1,7–4,5 | 2,5–3,8 |
| butene-1 | 0,1–3,0 | 0,2–2,0 | 0,2–1,0 |
| hexene-1 butene-1 | 0,1–2,0 | 0,2–1,5 | 0,2–0,8 |

| Monomer | General | Preferred | Most Preferred |
|---|---|---|---|
| and hexene-1 | 0,2–3,0 | 0,3–2,0 | 0,3–1,0 |
| propylene | remainder | remainder | remainder |

The xylene-soluble proportion of the copolymers is 2–20%, preferably 3–10%, in particular 4–8% by weight. They exhibit elongation values of more than 700%, preferably above 800%; viscosity numbers I of 200–400 cc./g., and melt flow index values $MFI_{190/5}$ of 1–20 g./10 min. The selection of the viscosity numbers I and the melt flow index values depends on the intended field of use. For example, for telephone cables, propylene copolymers are preferably employed having $MFI_{190/5}$ values of 3–20 g./10 min. and viscosity values I of 200–330 cc./g.; for feeder cables, preferably used are copolymers with $MFI_{190/5}$ values of 1–4 and viscosity numbers I of 280–400 cc./g. (A feeder cable is defined as a cable for high voltages.)

In the randomly copolymerized polypropylene used in accordance with this invention there are combined all the properties required for cable insulation. They display the high melt flow index value $MFI_{190/5}$ of 1–20 g./10 min. necessary for satisfactory processability. (This melt flow value is substantially higher than the melt flow index value of the sequence-type copolymers of British Pat. No. 1,328,102.) Despite this considerably higher melt flow index value, the copolymers utilized in accordance with the invention also show highly favorable insulation characteristics for use in electric cable insulation. They have a very high elongation of above 700%. (Conversely, the sequence-type copolymers with an ethylene content of 10–30% have, according to the data of the examples, a minor elongation of 7–98%.) Furthermore, the high elongation as well as the minor shrinkage of the random copolymer are relatively insignificantly altered by the aging process under field conditions. (The polymers used in this invention have a lower rigidity than both the sequence-type copolymers having 10–30% ethylene and the homopolymer of propylene.) Surprisingly, the random propylene copolymers utilized in accordance with the invention, despite their considerably higher melt flow index value, exhibit excellent stress crack resistance and very high toughness values.

In particular, the propylene copolymers used according to the invention have very excellent electrical properties such as a specific insulation resistance of $>10^{16} \Omega$, a dielectric loss factor tan $\delta$ of $<5 \times 10^{-4}$, a dielectric constant 2.3, a dielectric strength of 75 kV/mm., and an electrical creep resistance of KA 3 c. (KA 3 c. is an abbreviation designating the highest degree of the electrical creep resistance, determined by DIN 53 480 or VDE 0303 Part 1. The extent of crystallinity found in the partially crystalline copolymers of the invention is generally 30 to 60 percent, preferred 40 to 55 percent and most preferred 45 to 50 percent, measured by X-ray-determination.

The partially crystalline, randomly copolymerized polypropylenes are used as the insulation jackets, in varying wall thicknesses, e.g. 0.5 to 20 mm. of electrical conductors and also of wires of a great variety of cross sections. Due to their high melt flow index, it is also possible to jacket conductors having an extremely small cross section, e.g. 0.6 to 1.4 mm. in diameter. The copolymers utilized in accordance with the invention also have the highly important advantage that those cables which are ordinarily difficult to encase are readily and quickly insulated, and thus-obtained cables possess excellent electrical and mechanical properties. Accordingly, the invention is especially applicable to the production of telephone cables, field cables and high voltage cables.

The cable jacketing is effecting on the conventional machines, such as, for example, single-screw extruders with crossheads.

The partially crystalline, randomly copolymerized polypropylenes used according to this invention may contain, depending on the conditions of use, conventional polyolefin additives, such as antioxidants, stress stabilizers, copper stabilizers, corrosion inhibitors, UV stabilizers, as well as pigments and other additives. For example, Pentaerytrityl-tetrakis[3-(3,5-di-tert. butyl-4-hydroxyphenyl)]propionate, Di-lauryl-thiodipropionate, N-N' Diphenyl-para-phenylenediamine, N-N' Di-propionyl-3(3,5-di-tert. butyl-4-hydroxyphenyl)-hydrazid, Magnesiumoxide and 3,5-Di-tert. butyl-4-hydroxy-benzoicacid(2,4-di-tert. butylphenyl)-ester.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

(a) Preparation of a Random Propylene-Ethylene-Butene-1 Copolymer

For the copolymerization, there is used a mixed catalyst of 0.014 part by weight of a $TiCl_3$ catalyst having the composition $TiCl_3.0.33$ $AlCl_3$ (primarily $\delta$-modification, commercially available aluminum-reduced titanium trichloride) and 0.018 part by weight of diethylaluminum chloride. Using this catalyst, 20 parts by weight of propylene (99% strength) are polymerized in 50 parts by weight of a mixture in parts by weight of 38.4% trans-butene-2, 31.0% cis-butene-2, 30.5% butane, and 0.1% butene-1 at 60° C. after adding 0.0002 part by weight of hydrogen and 0.64 part by weight of ethylene under a pressure of 11–7 bar. The amount of ethylene is metered in during the entire polymerization period of 8 hours at a constant feed of 0.08 part by weight per hour. After a polymerization time of 8 hours, the polymerization is short-stopped by the addition of 0.1 part by weight of steam. By passing the suspension through nozzles, a pourable powder of a propylene-ethylene-butene-1 copolymer is obtained having the following properties:

| | |
|---|---|
| Viscosity value I | 320 cc./g. |
| $MFI_{190/5}$ value | 3.1 g./10 min. |
| Density | 0.898 g./cc. |
| Bulk density | 302 g./l. |
| Xylene soluble matter | 4.5% |
| Yield point | 25.9 N/mm$^2$ |
| Tear strength | 40.3 N/mm$^2$ |
| Elongation at rupture | >800% |
| Notch impact strength | 12 mJ/mm$^2$ (20° C.) |

| | |
|---|---|
| Bell test at 70° C. | after >2,000 h., no cracks |
| Specific insulation resistance | >$10^{16}$ Ω |
| Dielectric loss factor tanδ | <5 × $10^{-4}$ |
| Dielectric constant | 2.3 |
| Dielectric strength | 75 kV/mm. |
| Electrical creep resistance | KA 3 c. |

By infrared analysis, it is ascertained that the copolymer contains by weight 3.3% ethene and 0.2% butene-1, the remainder being propylene. The extent of crystallinity is 49%.

(b) Use of the Random Propylene-Ethylene-Butene-1 Copolymer for the Insulation of Electrical Cables In a single-screw extruder, the granulated polymer, produced as set forth in (a) and provided with antioxidants (such as 0.2% Pentaerytrityl-tetrakis[3-(3,5-di-tert. butyl-4-hydroxyphenyl)]propionate is plasticized of 190°-280° C. By means of a suitable die, the plasticized material is utilized to coat an aluminum conductor having a cross section of 150 mm² at a take-off speed of 30-80 m./min. The coating thickness is 1.5 mm. For cooling purposes, the thus-coated cable wire is passed through a water bath.

Test specimens were taken from the coating and subjected to a tensile stress test according to DIN [German Industrial Standard] 53 455, indicating a tensile strength of 33 N/mm² and a tensile elongation of 760%.

The insulation is distinguished by high mechanical, thermal, and electrical resistance, even under long-term stress.

With the use of thus-insulated cable wires, cables are manufactured for the 1 kV range. The good flexibility and the excellent frictional properties of the insulation facilitate the stranding process. The cable is suitable for a permanent use temperature of 90° C.

EXAMPLE 2

(a) Preparation of the Random Propylene Copolymer

An agitator-equipped pressure vessel is charged at 50° C. continuously with, per hour, 600 parts by weight of a C₄-cut consisting of 39.7% trans-butene-2, 20.3% cis-butene-2, 39.8% n-butane, and 0.2% butene-1; 0.15 part by weight of a TiCl₃ catalyst having the composition TiCl₂.0.3 AlCl₃; 0.20 part by weight of diethylaluminum monochloride; 250 parts by weight of propylene (99% strength); 3 parts by weight of ethylene; and 0.003 part by weight of hydrogen. The polymerization takes place in three series-connected vessels under a pressure in the first vessel of about 10 bar, in the second vessel of about 7 bar, and in the third vessel of about 5.5 bar. In the second and third vessels, respectively 3 parts by weight of ethylene and 0.001 part by weight of hydrogen are added per hour in metered amounts. The average residence time in each vessel is about 5 hours. From the third vessel, the thus-obtained polymer suspension is passed through nozzles via a level-controlled check valve into a further container while adding 2 parts by weight per hour of steam. The thus-formed propylene-ethylene-butene-1 copolymer has the following properties:

| | |
|---|---|
| Viscosity value I | 250 cc./g. |
| MFI₁₉₀/₅ value | 18 g./10 min. |
| Density | 0.893 g./cc. |
| Bulk density | 291 g./l. |
| Xylene soluble matter | 5.2% |
| Yield point | 25.1 N/mm² |
| Tear Strength | 36.5 N/mm² |
| Elongation at rupture | >800% |
| Notch impact strength | 8 mJ/mm² (20° C.) |
| Bell test at 70° C. | after >2,000 h., no cracks |
| Specific insulation resistance | >$10^{16}$ Ω |
| Dielectric loss factor tanδ | <5 × $10^{-4}$ |
| Dielectric constant | 2.3 |
| Dielectric strength | 75 kV/mm. |
| Electrical creep resistance | KA 3 c. |

According to the IR analysis, the copolymer contains 3.8% ethylene and 0.3% butene-1. The extent of crystallinity is 45%.

(b) Use of the Random Propylene Copolymer for the Insulation of Electrical Cables In a single-screw extruder, the granulated polymer, produced as set forth in (a) and provided with antioxidants, and copper stabilizers such as 0.2% Pentaerytrityl-tetrakis[3-(3,5 di-tert. butyl-4-hydroxphenyl)]-propionate and 0.2% N-N' Di-propionyl-3(3,5-di-tert. butyl-4-hydroxyphenyl)-hydrazid. is plasticized at temperatures of 190°-280° C. By means of a suitable die, the plasticized material is used to coat a cylindrical copper conductor having a cross section of 150 mm² and provided with a carbon-containing, conductive layer (conductor polishing compound consisting of 57% by weight of an isotactic polybutene-1 with a viscosity value I of 450 cc./g. and a density of 0.915 g./cc., 31% by weight of an extensively atactic polybutene-1 with a viscosity value I of 60 cc./g. and an ether-soluble proportion of 87%, as well as 12% by weight of a conductivity carbon black). The coating is executed at a take-off speed of 17 m./min. to provide an insulation coating of 8 mm. in thickness. For cooling purposes, the thus-coated wire is conveyed through a multistage water bath. By finishing the product in the manner conventional to the cable field, a cable is manufactured for use at 20 kV. (For additional details relating to the production of electric cables, attention is invited to Lowe, Ch. and Joyce, W. H., Wire and Wire Products 35 (1960), p. 862 etc.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process comprising passing current through an insulated electric cable, the improvement wherein the insulation of the insulated electric cable comprises partially crystalline, randomly copolymerized polypropylene having a proportion of ethylene, butene-1 and/or 1-hexane incorporated by polymerization of 1-6% by weight, a xylene-soluble proportion of 2-20% by weight, a viscosity value I of 200-400 cc./g., a melt flow index value (MFI$_{190/5}$) of 1–20 g./10 min., and an elongation value of above 700%.

2. A process according to claim 1, wherein the partially crystalline, randomly copolymerized polypropylene has a proportion of ethylene, butene-1 and/or 1-hexane incorporated by polymerization of 2–5% by weight, a xylene-soluble proportion of 3–10% by weight and an elongation value of above 800%.

3. In an insulated electric cable comprising a conductor enveloped by insulation, the improvement wherein the insulation comprises partially crystalline, randomly copolymerized polypropylene having a proportion of ethylene, butene-1 and/or 1-hexane incorporated by polymerization of 1–6% by weight, a xylene-soluble proportion of 2–20% by weight, a viscosity value I of 200–400 cc./g., a melt flow index value (MFI$_{190/5}$) of 1–20 g./10 min., and an elongation value of above 700%.

4. An insulated electric cable according to claim 3, wherein the partially crystalline, randomly copolymerized polypropylene has a proportion of ethylene, butene-1 and/or 1-hexane incorporated by polymerization of 2–5% by weight, a xylene-soluble proportion of 3–10% by weight, and an elongation value of above 800%.

5. In a process of producing insulated electric cable, the improvement wherein the insulation comprises partially crystalline, randomly copolymerized polypropylene having a proportion of ethylene, butene-1 and/or 1-hexene incorporated by polymerization of 1–6% by weight, a xylene-soluble proportion of 2–20% by weight, a viscosity value I of 200–400 cc./g., a melt flow index value (MFI$_{190/5}$) of 1–20 g./10 min., and an elongation value of above 700%.

6. A process according to claim 5, wherein the partially crystalline, randomly copolymerized polypropylene has a proportion of ethylene, butene-1 and/or 1-hexene incorporated by polymerization of 2–5% by weight, a xylene-soluble proportion of 3–10% by weight, and an elongation value of above 800%.

7. An insulated electric cable according to claim 3 wherein the insulation further comprises a copper stabilizer.

8. An insulated electric cable according to claim 7 wherein the insulation further comprises a UV absorbent.

9. An insulated electric cable according to claim 8 wherein the elongation value of the polypropylene insulation is substantially unaffected by aging.

10. An insulated electric cable according to claim 3 wherein the wall thickness of the insulation is 0.5 to 20 mm.

11. An insulated electric cable according to claim 9 wherein the electrical conductor has a diameter of 0.6 to 1.4 mm.

12. An insulated electric cable according to claim 3 wherein the polypropylene insulation has a melt flow index value (MFI$_{190/5}$) of 3–20 g/10 min. and a viscosity value I of 200–330 cc/g.

13. An insulated electric cable according to claim 3 wherein the polypropylene insulation has a melt flow index value (MFI$_{190/5}$) of 1–4 g/10 min. and a viscosity value I of 280–400 cc/g.

14. An insulated electric cable according to claim 3 wherein the extent of crystallinity of the partially crystallized polypropylene is 30–60 percent, as measured by x-ray determination.

15. An insulated electric cable according to claim 14 wherein the extent of crystallinity of the partially crystallized polypropylene is 40–55 percent, as measured by x-ray determination.

16. An insulated electric cable according to claim 15 wherein the extent of crystallinity of the partially crystallized polypropylene is 45–50 percent, as measured by x-ray determination.

17. An insulated electric cable according to claim 3, wherein the partially crystalline, randomly copolymerized polypropylene has a specific insulation resistance of $>10^6 \Omega$, a dielectric loss factor tan $\delta$ of $<5\times10^{-4}$, a dielectric constant 2.3, a dielectric strength of 75 kV/mm, and an electrical creep resistance of KA 3 c.

* * * * *